(12) United States Patent
Leggett et al.

(10) Patent No.: US 7,386,487 B2
(45) Date of Patent: Jun. 10, 2008

(54) COMPARISON SHOPPING VIA FINANCIAL MANAGEMENT SOFTWARE

(75) Inventors: Jacquelle D. Leggett, Raleigh, NC (US); Mark E. Peters, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 10/911,295

(22) Filed: Aug. 4, 2004

(65) Prior Publication Data

US 2006/0031123 A1 Feb. 9, 2006

(51) Int. Cl.
*G06Q 30/00* (2006.01)
*G06F 17/30* (2006.01)

(52) U.S. Cl. ....................................................... 705/26
(58) Field of Classification Search .................. 705/26, 705/27
See application file for complete search history.

(56) References Cited

U.S. PATENT DOCUMENTS

| | | | | |
|---|---|---|---|---|
| 6,009,413 | A | 12/1999 | Webber et al. | 705/26 |
| 6,533,173 | B2 | 3/2003 | Benyak | 235/383 |
| 6,594,557 | B1 | 7/2003 | Stefan et al. | 701/1 |
| 7,133,835 | B1* | 11/2006 | Fusz et al. | 705/26 |
| 2001/0023402 | A1 | 9/2001 | Flynn | 705/1 |
| 2002/0002504 | A1 | 1/2002 | Engel et al. | 705/26 |
| 2002/0069115 | A1 | 6/2002 | Fitzpatrick | 705/26 |
| 2002/0111873 | A1 | 8/2002 | Ehrlich et al. | 705/26 |
| 2002/0174021 | A1 | 11/2002 | Chu et al. | 705/26 |
| 2002/0178013 | A1 | 11/2002 | Hoffman et al. | 705/1 |
| 2003/0074267 | A1 | 4/2003 | Acharya et al. | 705/26 |
| 2003/0105711 | A1* | 6/2003 | O'Neil | 705/39 |
| 2003/0126020 | A1* | 7/2003 | Smith et al. | 705/21 |
| 2003/0158783 | A1 | 8/2003 | Lin | 705/26 |
| 2003/0195808 | A1 | 10/2003 | Brown et al. | 705/14 |
| 2003/0225632 | A1 | 12/2003 | Tong et al. | 705/27 |
| 2003/0233360 | A1* | 12/2003 | Tan | 707/7 |
| 2005/0097003 | A1* | 5/2005 | Linker | 705/26 |
| 2005/0097017 | A1* | 5/2005 | Hanratty | 705/35 |
| 2005/0144066 | A1* | 6/2005 | Cope et al. | 705/14 |
| 2005/0149437 | A1* | 7/2005 | Zellner et al. | 705/39 |

FOREIGN PATENT DOCUMENTS

EP 1148433 A1 * 10/2001

OTHER PUBLICATIONS

Fortt, J., "Plugged in Personal Finance Home Computers and the Internet Are Powerful Tools for Managing Your Money," San Jose Mercury News, Jan. 24, 2002, Morning Final Edition, Personal Technology Section, p. 1E.*
Chu, H.; Lection, D.; "A Method for Location-Based Comparison Shopping from the Click-and-Brick Stores" RD n449 Sep. 2001 Article 80 p. 1534.

* cited by examiner

*Primary Examiner*—Nicholas D Rosen
(74) *Attorney, Agent, or Firm*—Bruce Clay; Rudolf O. Siegrsmund; Gordon & Rees, LLP

(57) ABSTRACT

The invention comprises a financial management program and one or more databases containing information on merchants and their products. The program interacts with the databases containing the product information to return the prices and availability of goods located in a designated area. The program compares prices from various merchants and displays the results to the consumer. The program also allows the consumer to compare the prices with a household budget and financial data, while keeping track of trends in the consumer's spending and buying habits.

4 Claims, 6 Drawing Sheets

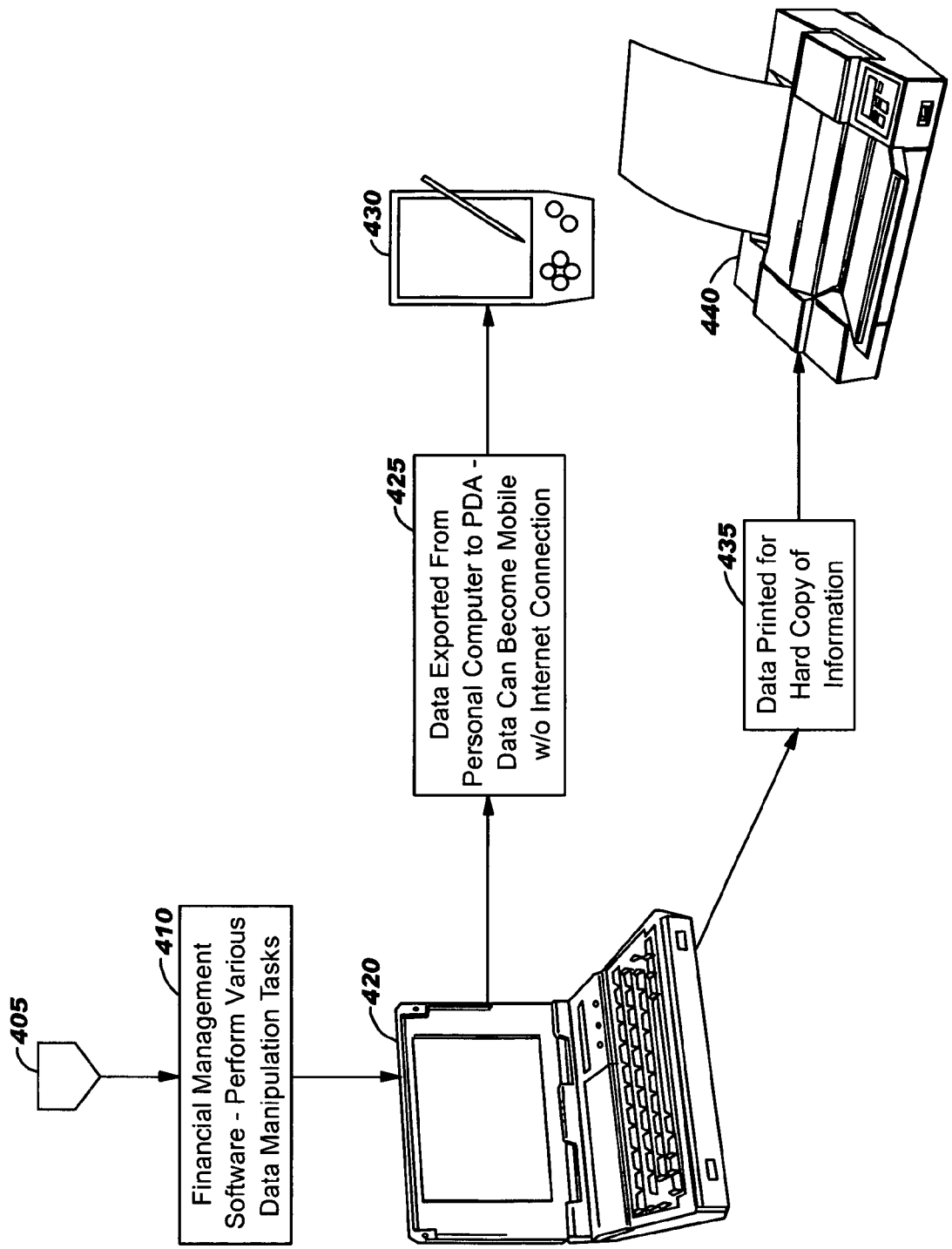

COMPARISON SHOPPING VIA FINANCIAL MANAGEMENT SOFTWARE

FIELD OF THE INVENTION

The invention described below relates to data processing apparatus and methods for processing financial data in general, and specifically to a computerized integration of comparison shopping software into personal financial management software.

BACKGROUND OF THE INVENTION

The proliferation of the personal computer and the rapid expansion of Internet access in recent years have contributed significantly to the popularity of "online" shopping among consumers worldwide. Many merchants now provide online shopping alternatives to consumers, complete with detailed descriptions of goods and services, as well as pricing that can change immediately to reflect changing market conditions.

Just as personal computers and the Internet have fueled the growth of online shopping, online shopping, in turn, has fueled the growth of an entirely new online service industry that caters to consumers looking for the best price on goods and services. Typically, these new service providers collect product information from a variety of online shops, and then present the product information to the consumer through a website in a format suitable for product and price comparisons. Consequently, such websites have become known colloquially as "comparison shopping" websites.

Currently, comparison shopping websites typically implement one of two methods of collecting product information. The first method for comparison shopping involves the creation of a search engine that allows a consumer to select a product of interest from a predefined list of products or to insert a particular product into a search field. Once the consumer has selected or inserted a product, the search engine searches for similar products in multiple merchants' websites to find the prices and availability offered by each. The results are presented to the user through a webpage that lists the merchant, product, price, and availability, along with other data particular to each comparison shopping website. From this webpage, the consumer can choose the merchant and product that best meets the consumer's needs. Generally, the consumer then can purchase the product either from the comparison shopping site or from the merchant's online shop or physical location.

Another popular comparison shopping solution requires more interaction with the merchant than the method just described. Rather than searching merchant websites, as described above, merchants insert product information, such as price, product description, and availability, directly into a comparison shopping database, or they send their information to a third-party host who inserts the information into the database. See U.S. Patent Application Publication No. US 2003/0074267 A1 (published Apr. 17, 2003). When a consumer accesses this type of comparison shopping website, he or she enters product search criteria through a dynamic webpage. A web server then queries the database to find products matching the consumer's criteria. The database returns all matching products, which the web server displays to the consumer through a web browser. The consumer then can act upon the information accordingly.

To date, some industries have harnessed comparison shopping and its capabilities better than others. The airline, rental car, hotel, and personal electronic industries, in particular, are well represented in comparison shopping websites. Merchants of groceries and other household products, though, have not yet been able to offer an effective comparison shopping service. While several websites have allowed consumers to purchase groceries online, the prices and inventory have been limited to single merchants.

Financial management software also has become popular with personal computer users. Users of such software as INTUIT's QUICKEN and MICROSOFT MONEY have always been able to track savings and checking account balances, credit card balances, and other spending habits. Today, though, many of these programs also allow users to retrieve bank and credit card statements over the Internet. Generally, users also can view spending habits and account balances in graphs and charts, which allow the user to analyze trends and cash flow.

Thus, neither online shopping nor financial management software is new. Currently, though, consumers have no effective means for integrating their online shopping experience with their financial management software. The invention described below addresses the need in the art for such a means, which would provide many benefits to the consumer. Specifically, a consumer could use such a means to integrate a personal budget into shopping criteria, which the consumer could then combine with a single shopping list to compare products at a variety of stores. The consumer also could transfer shopping information and comparison results to a mobile device, which the consumer then could take to a store for easy reference. These and other objects of the invention will be apparent to those skilled in the art from the following detailed description of a preferred embodiment of the invention.

SUMMARY OF THE INVENTION

The invention described below is an improved means for online comparison shopping. In particular, the invention comprises one or more product databases and an improved financial management computer program operable to retrieve comparative product information from the product databases and to display the comparative product information. A merchant either directly posts product information to the databases or submits the information to a third-party that updates and maintains the databases. A consumer then enters a list of desired products (a "shopping list") into the improved financial management program, which in turn retrieves the product information from the product databases. The financial management program then processes the product information to determine comparative values, which facilitate the consumer's purchase decision.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 4 illustrates a preferred embodiment and new capabilities of the improved financial management software.

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "financial management program."

Figure 1:
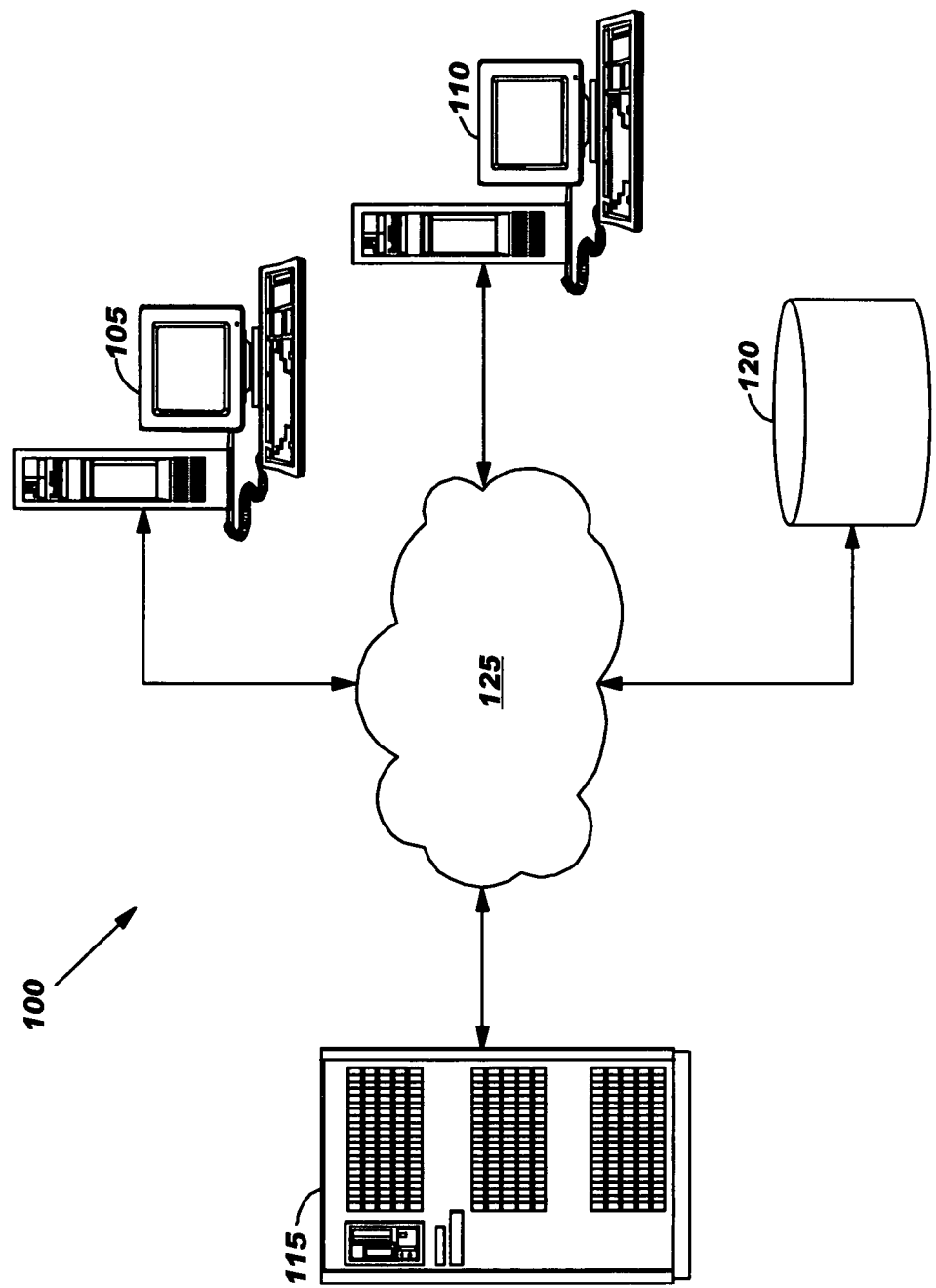
FIG. 1 illustrates the internal configuration of a computer having the computer program of the present invention loaded into memory.

Additionally, the financial management program is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
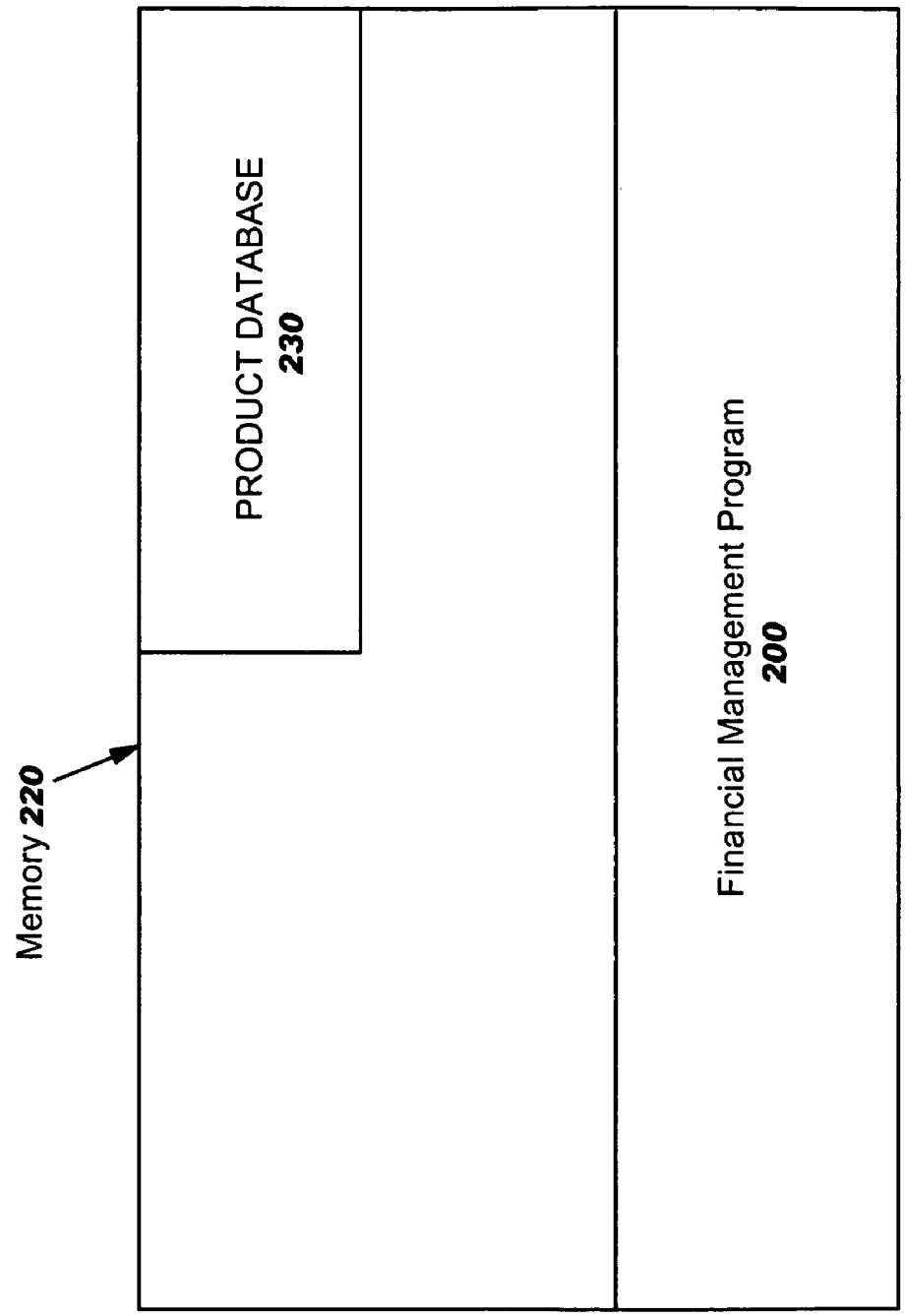
FIG. 2 illustrates a prior art architecture for connecting various hardware devices to create a network for transferring data from one computer to another.

Financial management program 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2 is included merely as a descriptive expedient and does not necessarily reflect any particular physical embodiment of memory 220. As depicted in FIG. 2, though, memory 220 may include additional data and programs. Of particular import to financial management program 200, memory 220 may include product database 230, with which financial management program 200 interacts.

Figure 3A:
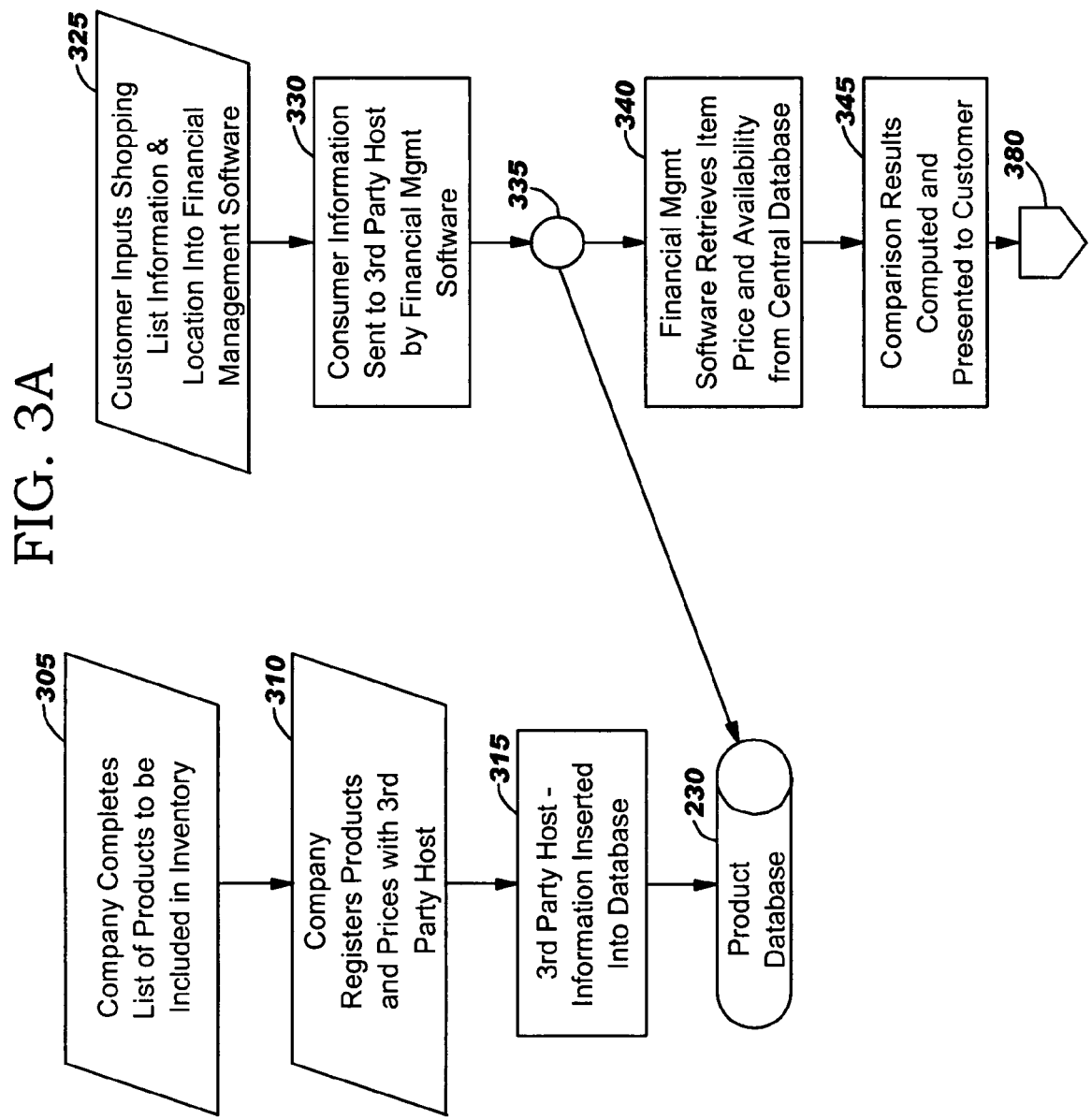
FIG. 3A depicts the interaction of merchants and consumers with a preferred embodiment of the present invention.

FIG. 3A depicts the interaction of merchants and consumers with financial management program 200 and product database 230. First, each merchant compiles a list of the products they wish to offer to consumers (305). Each list should include the price, availability, and a description of each product. Each product also should include a unique identifier, such as a Universal Product Code (UPC) or serial number, in order for products to be properly compared once inserted into the database. In one embodiment, each merchant then provides this information, along with information about the merchant and the merchant's location (e.g. zip code), to a third-party host 310 that maintains and updates product database 230. This third-party host, using file transfer technology such as File Transfer Protocol (FTP), then performs the necessary updates to product database 230. File transfer technologies are well known in the art and need not be described further here. In an alternative embodiment, each merchant directly inserts their respective product list into product database 230.

Generally, merchants should update their product information on a regular basis to ensure that product database 230 contains up-to-date, reliable information. In alternate embodiments, merchants may submit updates daily to the third-party host, or the third-party host may provide an automated process that allows a merchant to update product information through a website or client program. These methods are well known for those in the art and need not be described further here.

As illustrated in FIG. 3A, a consumer begins the shopping process by compiling a shopping list and entering the list into financial management program 200 (325). The shopping list comprises products that the consumer desires to purchase. The consumer may specify generic products, such as "milk" or "bread," or may specify brand name products. Additionally, the consumer may include preferred geographical shopping limits. For example, the consumer may limit the shopping area to a specific zip code, area code, or neighborhood.

Once the consumer's shopping list is complete, the consumer submits the shopping list to the third-party host via financial management program 200 (330). The host then queries product database 230 for the products in the shopping list (335). If the consumer has designated a preferred geographical shopping area, the host likewise limits the query to merchants within the preferred shopping area. The host then returns the query results to financial management program 200 (340). Financial management program 200 then processes the query results to determine the minimum cost to the consumer if the consumer purchased all products from a single merchant and the minimum cost of each product without regard to merchant (345). Financial management program 200 also may generate dynamic reports and informational charts on spending habits, cost comparison, and other purchase-related data. Such reports provide many benefits to the consumer, including the ability to determine which providers consistently offer the lowest prices on products that the consumer routinely purchases. Determining such consistency, in turn, allows a consumer to make informed decisions on where to purchase products, even if the consumer cannot access financial management program 200 immediately. Financial management program 200 then displays the processing results to the consumer (345), and the consumer selects the preferred products and merchants. In a preferred embodiment, financial management program 200 additionally queries product database 230 to determine the number of preferred products that the preferred merchant has available. Financial management program 200 then interfaces with the preferred merchant's transaction processing system, thereby allowing the consumer to place an order with the preferred merchant for the preferred products through financial management program 200.

Figure 3B:
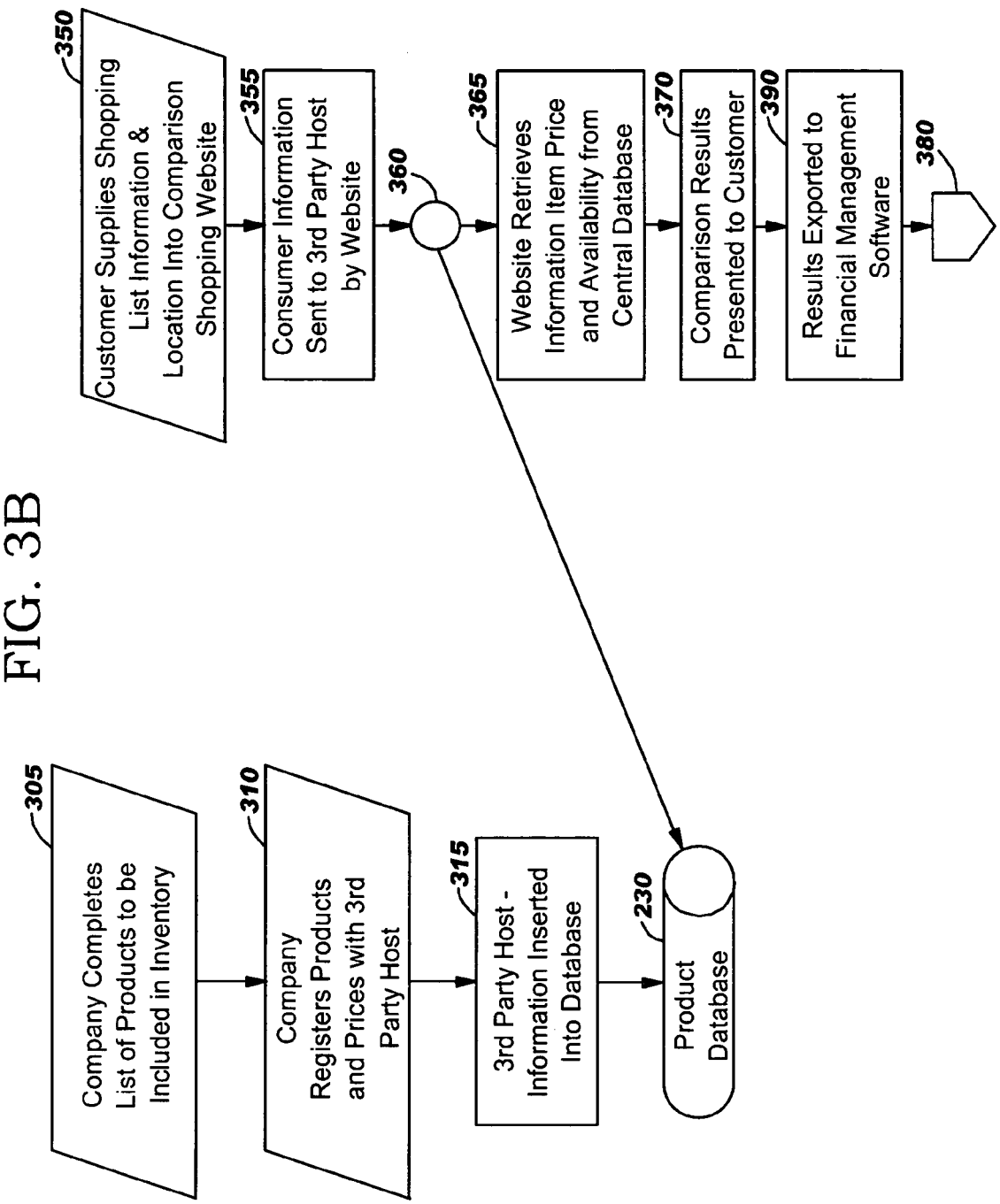
FIG. 3B depicts the interaction of merchants and consumers with an alternative embodiment of the present invention.

FIG. 3B depicts an alternative embodiment of the present invention, in which the consumer accesses product database 230 through a web-based application. In this embodiment, the consumer compiles the shopping list and submits it to a server through a web browser (350), rather than financial management program 200. Either the third-party host or yet another independent web host may operate the server. Regardless, the server then transmits the consumer's list to the third-party host (355). The third-party host then queries product database 230 for the products in the shopping list (360) and returns the query results to the web browser via the server (365). The web browser then processes the query results, as described above. The browser then displays the results to the consumer (370), generates a data file that financial management program 200 can import (390) for further processing, or both.

FIG. 4 illustrates the interaction between financial management program 200 and various hardware devices, after the third-party host has returned the query results. Computer 420 represented in FIG. 4 illustrates the primary method of viewing the data returned and created by this invention. A consumer can use computer 420, properly configured by financial management program 200, to perform the initial actions of the comparison shopping process, including preparing a shopping list. Additionally, the consumer can use financial management program 200 to determine if the shopping list conforms to a household budget. Computer 420 also is operable to transfer data to mobile hardware devices (425), such as Personal Data Assistant (PDA) 430. PDA 430 and other mobile computing devices allow consumers to take the query results and processed information with them to the merchant, which in turn allows the consumer to verify that the prices of the products in the merchant's store match the prices offered through product database 230 and that purchase decisions conform to budgets and plans. Additionally, the consumer may print the query results and processed information (435), which the consumer also may take to the merchant. The printed information provides the same benefits as PDA 430.

Figure 5:
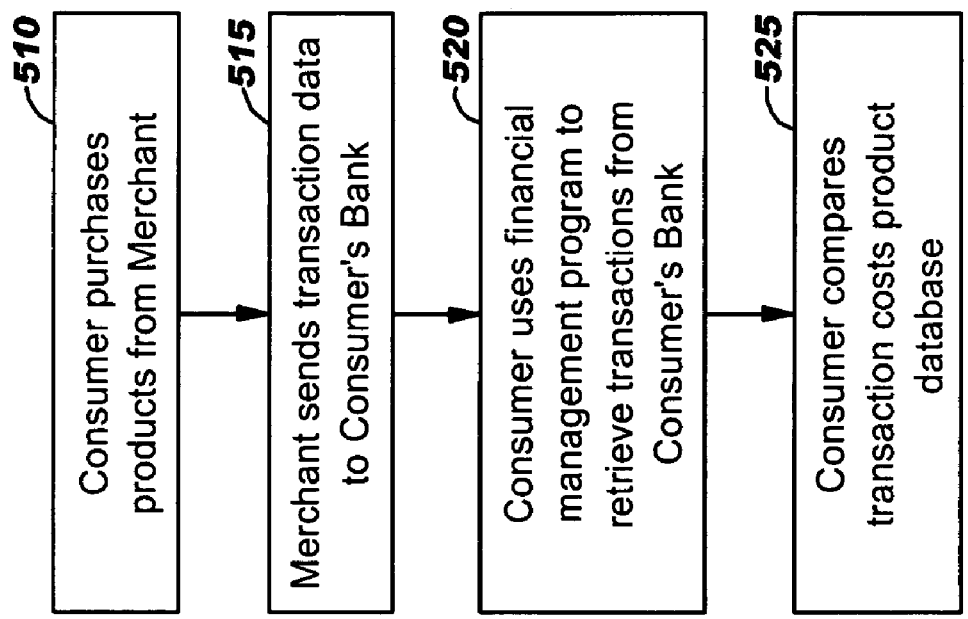
FIG. 5 illustrates an alternative embodiment of the invention in which the financial management software is used to compare product prices based upon information received from a bank after the purchases have been made.

FIG. 5 illustrates another embodiment of the invention. In this embodiment, the consumer purchases products from a merchant's store (510). The merchant then transmits transaction data, including product prices, descriptions, quantity, and UPCs to the consumer's bank (515). The consumer subsequently can use financial management program 200 to retrieve the transaction data from the bank (520). The consumer then may compare this transaction data with data in product database 230 (525), which allows the consumer to compare the prices of purchased products to another merchant's prices, as well as compare current prices with historical prices. Financial management program 200 calculates the cost of the transaction at each store, returning both a dollar and percentage savings on the purchased products, so that the consumer can determine whether the savings on the products, or a subset of products, is worth making additional trips to other stores, rather than paying a premium price to a merchant offering all of the requested products.

A preferred form of the invention along with several alternative embodiments have been shown in the drawings and described above, but variations in the preferred form will be apparent to those skilled in the art. The preceding description is for illustrative purposes only, and the invention should not be construed as limited to the specific form shown and described. The scope of the invention should be limited only by the language of the following claims.

What is claimed is:

1. A process for comparing a plurality of merchants' prices for products, the process comprising the steps of:
   inserting into a database each merchant's prices;
   purchasing a product;
   transmitting the purchase price to a bank;
   receiving the purchase price from the bank;
   receiving the merchant prices from the database;
   matching the purchased product with all corresponding merchant prices in the database; and
   determining the difference between the purchase price and each corresponding merchant price;
   whereby a consumer can compare the purchase price with each merchant's offered price for the same product.

2. The process of claim 1 further comprising the step of designating a preferred merchant location; wherein the merchant prices retrieved are limited to prices offered by merchants within the preferred merchant location.

3. The process of claim 1 further comprising the step of determining the maximum difference between the purchase price and the corresponding merchant prices.

4. The process of claim 2 further comprising the step of determining the maximum difference between the purchase price and the corresponding merchant prices.

* * * * *